US012659203B2

(12) United States Patent
Li et al.

(10) Patent No.: US 12,659,203 B2
(45) Date of Patent: Jun. 16, 2026

(54) SIGNAL SENDING METHOD, RECEIVING METHOD, TRANSMITTING METHOD AND RELATED PRODUCT

(71) Applicant: EverPro (Wuhan) Technologies Company Limited, Wuhan (CN)

(72) Inventors: Yan Li, Beijing (CN); Yufeng Cheng, Beijing (CN); Hui Jiang, Beijing (CN); Lihua Wei, Wuhan (CN); Jinkuan Tang, Wuhan (CN)

(73) Assignee: EVERPRO (WUHAN) TECHNOLOGIES COMPANY LIMITED, Wuhan (CN)

( * ) Notice: Subject to any disclaimer, the term of this patent is extended or adjusted under 35 U.S.C. 154(b) by 1 day.

(21) Appl. No.: 18/633,426

(22) Filed: Apr. 11, 2024

(65) Prior Publication Data

US 2024/0422035 A1    Dec. 19, 2024

(30) Foreign Application Priority Data

Jun. 19, 2023    (CN) .......................... 202310732756.4
Jun. 19, 2023    (CN) .......................... 202310735412.9

(51) Int. Cl.
H04L 27/04        (2006.01)
H04L 1/00         (2006.01)
H04L 27/06        (2006.01)

(52) U.S. Cl.
CPC ............ H04L 27/04 (2013.01); H04L 1/0061 (2013.01); H04L 27/06 (2013.01)

(58) Field of Classification Search
CPC ........ H04L 27/04; H04L 27/06; H04L 1/0061
See application file for complete search history.

(56) References Cited

U.S. PATENT DOCUMENTS 7,386,061 B1 *    6/2008    Merriam, Jr. ....... H04L 27/0002
                                                                375/316
8,886,055 B1    11/2014    Morero

FOREIGN PATENT DOCUMENTS

CN        102804765 A    11/2012
CN        109586795 A     4/2019
                (Continued)

OTHER PUBLICATIONS

The first office action received in the corresponding Chinese Application 202310735412.9, mailed Nov. 4, 2023.
(Continued)

*Primary Examiner* — Rahel Guarino
(74) *Attorney, Agent, or Firm* — Kilpatrick Townsend & Stockton LLP

(57) ABSTRACT

The disclosure discloses a signal sending method, a receiving method, a transmitting method and a related product, in particular to a signal sending module, a signal transmission device, a signal receiving module, a signal sending method, a receiving method and a transmitting method. The signal sending module comprises: a first signal parameter determining module, configured to connect a source, for receiving a first signal to determine a first number of first signal channels and a first symbol rate; wherein, the first number of first signal channels is the quantity of channels used by the source to provide the first signal; and a PAM-N modulation module performing PAM-N modulation processing on the first signal, the quantity of signal channels of a second signal output by the PAM-N modulation module is less than or equal to the first number of first signal channels, thus reduce a number of wires of cables.

20 Claims, 13 Drawing Sheets

(56) References Cited

FOREIGN PATENT DOCUMENTS

| | | | |
|----|------------|---|--------|
| CN | 208723903  | U | 4/2019 |
| CN | 110739999  | A | 1/2020 |
| CN | 112564851  | A | 3/2021 |
| CN | 112702135  | A | 4/2021 |
| CN | 113347397  | A | 9/2021 |
| JP | 2012124934 | A | 6/2012 |

OTHER PUBLICATIONS

The first search report received in the corresponding Chinese Application 202310735412.9, mailed Nov. 4, 2023.

The notification to grant patent right for invention received in the corresponding Chinese Application 202310735412.9, mailed Jan. 10, 2024.

The first office action received in the corresponding Chinese Application 202310732756.4, mailed Nov. 3, 2023.

The first search report received in the corresponding Chinese Application 202310732756.4, mailed Nov. 3, 2023.

The notification to grant patent right for invention received in the corresponding Chinese Application 202310732756.4, mailed Jan. 13, 2024.

* cited by examiner

Acquiring a first signal from a source ⟶ S201

Parsing the first signal to identity a first number of first signal channels and a first symbol rate ⟶ S202

Modulating the first signal with a determined modulation mode to obtain a second signal ⟶ S203

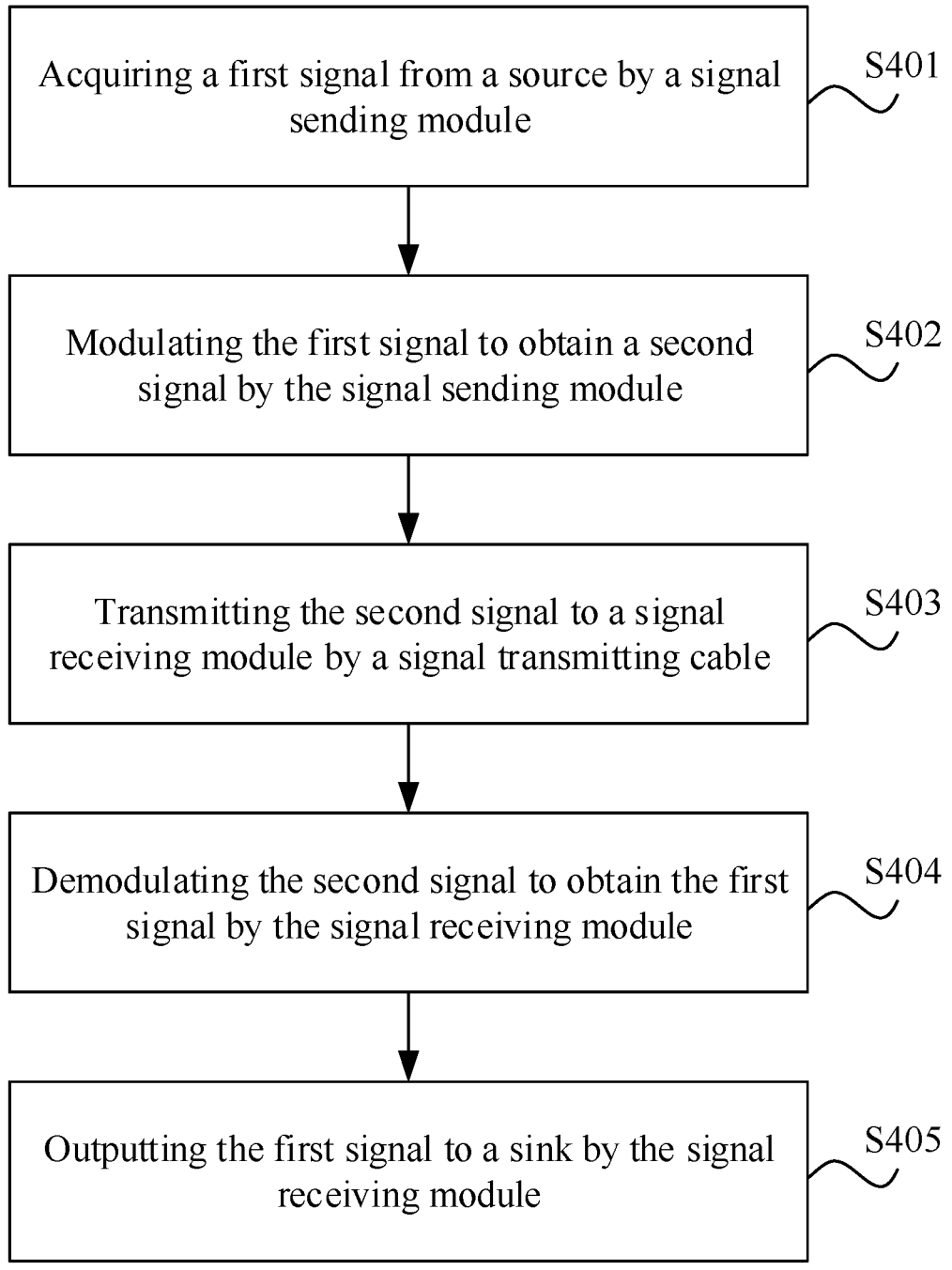

Acquiring a first signal from a source by a signal sending module — S401

Modulating the first signal to obtain a second signal by the signal sending module — S402

Transmitting the second signal to a signal receiving module by a signal transmitting cable — S403

Demodulating the second signal to obtain the first signal by the signal receiving module — S404

Outputting the first signal to a sink by the signal receiving module — S405

FIG. 4

SIGNAL SENDING METHOD, RECEIVING METHOD, TRANSMITTING METHOD AND RELATED PRODUCT

CROSS-REFERENCE TO RELEVANT APPLICATIONS

The present application claims the priority of Chinese Patent Application 2023107354129 filed on Jun. 19, 2023 and Chinese Patent Application 2023107327564 filed on Jun. 19, 2023, the entire contents of which are hereby incorporated by reference.

TECHNICAL FIELD

The present disclosure generally relates to the technical field of signal processing. More particularly, the present disclosure relates to a signal sending module, a signal transmission device, a signal receiving module, a signal sending method, a receiving method and a transmitting method.

BACKGROUND

At present, in a signal transmitting process, signals can be transmitted through multiple metal wires, thus improving transmission efficiency. However, the use of the multiple metal wires will inevitably lead to an increase in a diameter of a signal transmitting cable, which will lead to an increase in a cost of the signal transmitting cable.

Especially in the field of multimedia transmission protocols and interfaces, external interfaces mainly include a DP (DisplayPort) interface and HDMI (High Definition Multimedia Interface) interface, wherein an HDMI channel corresponding to the HDMI interface includes four signal transmitting lines, while signals transmitted by the DP interface are composed of data channel signals for transmitting images and auxiliary channel signals for transmitting status and control information related to images, specifically including Main Link and auxiliary channel (AUX Channel) for DisplayPort data transmitting.

Therefore, a current HDMI/DP cable needs four high-specification wires to transmit signals. With the increase of signal rate and cable length, a manufacturing cost of the HDMI/DP cable will also rise sharply.

In view of this, it is urgent to provide a signal sending solution, so as to reduce the number of wires required for signal transmitting cables in a signal sending process, thereby reducing a transmitting cost.

SUMMARY

In order to solve at least one or more technical problems mentioned above, the present disclosure proposes signal sending methods, receiving methods, transmitting methods and related products in various aspects.

In a first aspect, the present disclosure provides a signal sending module, including: a first signal parameter determining module, configured to connect to a source, for receiving a first signal provided by the source to determine a first number of first signal channels and a first symbol rate; wherein the first number of first signal channels is the quantity of channels used by the source to provide the first signal, and the first symbol rate is a symbol rate of the first signal from the source; and a PAM-N modulation module configured to perform PAM-N modulation processing on the first signal to output a second signal, wherein the quantity of signal channels in the second signal is less than or equal to the first number of the first signal channels.

In some specific embodiments of the present disclosure, the signal sending module further includes: a first signal alignment module configured to connect the source to time align the first signal, thereby forming a first aligned signal; a first forward error correction module configured to generate an error correction code based on the first aligned signal; and a signal packing module configured to take a received signal as a signal to be modulated, to pack the received signal into a first data packet and to incorporate the first number of first signal channels and the first symbol rate into a header information of the first data packet.

In some specific embodiments of the present disclosure, the first forward error correction module is connected to the first signal alignment module; and the signal packing module is connected to both the first forward error correction module and the first signal parameter determining module, wherein the signal packing module takes the first aligned signal from the first signal alignment module as the signal to be modulated.

In some specific embodiments of the present disclosure, the signal packing module is connected to both the first signal alignment module and the first signal parameter determining module, wherein the signal packing module takes the first aligned signal from the first signal alignment module as the signal to be modulated; and the first forward error correction module is connected with the signal packing module, wherein the first forward error correction module incorporates the generated error correction code into the first data packet.

In some specific embodiments of the present disclosure, the signal sending module further includes: a signal shunt module, input ends of the signal shunt module are connected to the first signal alignment module and the first signal parameter determining module, and an output end of the signal shunt module is connected to an input end of the first forward error correction module, and the signal shunt module is configure to shunt the first aligned signal into multi-channel parallel signals based on the first number of first signal channels and the first symbol rate; the first forward error correction module is configured to generate an error correction code according to the multi-channel parallel signals; and the signal packing module is configured to takes the multi-channel parallel signals output from the signal shunt module as a signal to be modulated.

In some specific embodiments of the present disclosure, the signal sending module includes a plurality of signal packing modules and a plurality of PAM-N modulation modules; the plurality of signal packing modules are in one-to-one correspondence with the plurality of PAM-N modulation modules, wherein input ends of the plurality of signal packing modules are all connected to the first signal alignment module and output end of the first signal parameter determining module, and an output end of each signal packing module in the plurality of signal packing modules is connected to an input end of the PAM-N modulation module corresponding to the signal packing module.

In some specific embodiments of the present disclosure, an input end of the PAM-N modulation module is connected with an output end of the signal packing module, and an output end of the PAM-N modulation module is used for being connected with a signal transmitting cable, wherein the PAM-N modulation module is configured to modulate the packed signal to be modulated based on a determined modulation mode to form the second signal transmitted on the signal transmitting cable.

In some specific embodiments of the present disclosure, the first signal is a high-speed signal, including: a multimedia signal and/or a clock signal.

In some specific embodiments of the present disclosure, a symbol rate of the second signal is less than or equal to the first symbol rate.

In some specific embodiments of the present disclosure, in the signal sending process, the first signal parameter determining module is configured to identify a change of the first number of first signal channels and/or the first symbol rate in a signal sending process, and to adjust a modulation mode of the PAM-N modulation module accordingly to accommodate changes in the change of the first number of first signal channels and/or the first symbol rate.

In a second aspect, the present disclosure provides a signal transmission device, including: a signal receiving module, a signal transmitting cable and the signal sending module according to the first aspect; wherein, the signal receiving module includes: a PAM-N demodulation module, configured to connect to the signal transmitting cable for demodulating a second signal; and wherein a demodulation mode of the PAM-N demodulation module corresponds to the modulation mode of the first signal in the PAM-N modulation module.

In some specific embodiments of the present disclosure, the signal receiving module includes: a signal unpacking module, connected to the PAM-N demodulation module, configured to read the second data packet output from the PAM-N demodulation module to obtain the first number of first signal channels and the first symbol rate, and to decode the second data packet into an unpacked signal; a second forward error correction module, connected to the signal unpacking module, and configured to perform error correction decoding on the unpacked signal based on an error correction code in the second data packet; a signal demultiplexing module, with an output end configured to connect to a sink, and with input ends connected to both the second forward error correction module and a second signal parameter determining module, and configured to take the unpacked signal after the error correction decoding as a signal to be demultiplexed, to demultiplex the signal to be demultiplexed onto corresponding signal lines with the same number as the first number of first signal channels to form the first signal, and to output the first signal on the corresponding signal lines at the first symbol rate to the sink; and the second signal parameter determining module, connected to the signal unpacking module, and the signal demultiplexing module, and configured to identify the first number of first signal channels and the first symbol rate from an header information read by the signal unpacking module, and to control the signal demultiplexing module to demultiplex the signal to be demultiplexed based on the first number of first signal channels and the first symbol rate.

In some specific embodiments of the present disclosure, the signal transmitting cable includes a plurality of cores; the signal receiving module includes: a plurality of PAM-N demodulation modules and a plurality of signal unpacking modules wherein the plurality of PAM-N demodulation modules and the plurality of signal unpacking modules are in one-to-one correspondence with the plurality of cores; wherein input ends of the plurality of PAM-N demodulation modules are respectively connected with the corresponding cores, and output ends of the plurality of PAM-N demodulation modules are respectively connected with corresponding signal unpacking modules, the PAM-N demodulation modules being used for demodulating second signals respectively transmitted by the plurality of cores to obtain a plurality of second data packets, and transmitting the plurality of second data packets to respective signal unpacking modules; and wherein output ends of the plurality of signal unpacking modules are all connected to the input end of the second signal parameter determining module, and the signal unpacking modules are configured to decoding the plurality of second data packets into a plurality of unpacked signals.

In some specific embodiments of the present disclosure, the signal sending module includes a signal shunt module, wherein the signal receiving module includes: a second signal alignment module; the unpacked signal decoded by the signal unpacking module is multi-channel parallel signals; an input end of the second signal alignment module is connected with the output end of the signal unpacking module, and an output end of the second signal alignment module is connected with the input end of the second forward error correction module, wherein the second signal alignment module is configured to align the multi-channel parallel signals from the signal unpacking module in time; the second forward error correction module is configured to perform error correction decoding on the aligned multi-channel parallel signals based on the error correction code in the second data packet; and the signal demultiplexing module is configured to take the multi-channel parallel signals after the error correction decoding as the signal to be demultiplexed.

In a third aspect, the present disclosure provides a signal receiving module, including: a PAM-N demodulation module, configured to connect to a signal transmitting cable for demodulating a second signal acquired from the signal transmitting cable to obtain a second data packet; a signal unpacking module, connected to the PAM-N demodulation module, configured to read an header information of the second data packet to obtain a first number of first signal channels and a first symbol rate, and to decode the second data packet into an unpacked signal; and a signal demultiplexing module, with an output end configured to connect to a sink, and with input ends connected to the signal unpacking module, and configured to take the unpacked signal as a signal to be demultiplexed according to the first number of first signal channels and the first symbol rate, to demultiplex the signal to be demultiplexed onto corresponding signal lines with the same number as the first number of first signal channels to form the first signal, and to output the first signal on the corresponding signal lines at the first symbol rate.

In some specific embodiments of the present disclosure, the signal receiving module includes: a plurality of PAM-N demodulation modules and a plurality of signal unpacking modules; wherein, the plurality of PAM-N demodulation modules are in one-to-one correspondence with the plurality of signal unpacking modules; wherein, the input ends of the plurality of PAM-N demodulation modules are configured to connect the corresponding signal transmitting cable, and the PAM-N demodulation modules are configured to demodulating a plurality of second signals to obtain a plurality of second data packets; and wherein, the input ends of the plurality of signal unpacking modules are connected with the output ends of the corresponding PAM-N demodulation modules, output ends of the plurality of signal unpacking modules are all connected to an input end of a second signal parameter determining module, and the signal unpacking modules are configured to decoding the plurality of second data packets into a plurality of unpacked signals and sending the plurality of unpacked signals to the signal demultiplexing module.

In some specific embodiments of the present disclosure, the signal receiving module further includes: a second forward error correction module, an input end of which is connected with all the signal unpacking modules, configured to performing error correction decoding on the unpacked signal based on an error correction code in the second data packet, and sending the unpacked signal after the error correction decoding to the signal demultiplexing module; the signal demultiplexing module being configured to taking the unpacked signal after the error correction decoding as the signal to be demultiplexed; and a second signal parameter determining module, an input end of which is connected with an output end of the signal unpacking module, and an output end of which is connected with the signal demultiplexing module, configured to identifying the first number of first signal channels and the first symbol rate from the header information read by the signal unpacking module, and controlling the signal demultiplexing module to demultiplex the signal to be demultiplexed based on the first number of first signal channels and the first symbol rate.

In some specific embodiments of the present disclosure, the signal receiving module further includes: a second signal alignment module, wherein: in the signal receiving module, the unpacked signal decoded by the signal unpacking module is multi-channel parallel signals; an input end of the second signal alignment module is connected with the output end of the signal unpacking module, and an output end of the second signal alignment module is connected with the input end of the second forward error correction module, and the second signal alignment module is configured to align\ the multi-channel parallel signals output from the signal unpacking module in time; the second forward error correction module is configured to perform error correction decoding on the aligned multi-channel parallel signals based on the error correction code in the second data packet; and the signal demultiplexing module is configured to take the multi-channel parallel signals after the error correction decoding as the signal to be demultiplexed.

In a fourth aspect, the present disclosure provides a signal module, including: the signal sending module according to the first aspect and the signal receiving module according to the third aspect; wherein, the number of the PAM-N modulation modules is the same as that of the number of the PAM-N demodulation module.

In a fifth aspect, the present disclosure provides a signal sending method, including: acquiring a first signal from a source; a parsing step of parsing the first signal to identify a first number of first signal channels and a first symbol rate; wherein, the first number of first signal channels is the quantity of channels used by the source, and the first symbol rate is a symbol rate of the first signal; and modulating the first signal with a determined modulation mode to obtain a second signal; wherein, a number of second signal channels is less than the number of first signal channels.

In some specific embodiments of the present disclosure, after the parsing step, the method further includes: an alignment step of aligning the first signal from an M-channel serial signal into an M-channel parallel signal, wherein M is a positive integer; generating an error correction code based on the M-channel parallel signal through a forward error correction coding technology; taking the M-channel parallel signal as a signal to be modulated, packing the signal to be modulated with the error correction code to form a first data packet, and incorporating the first number of first signal channels and the first symbol rate to header information of the first data packet; and the modulating the first signal with the determined modulation mode to obtain the second signal includes: modulating the packed signal to be modulated to obtain the second signal.

In some specific embodiments of the present disclosure, after the alignment step, the method further includes: shunting the M-channel parallel signal according to the first number of first signal channels and the first symbol rate to form S1-channel parallel signals, wherein S1 is greater than M, and S1 is a positive integer; an error correction code generating step, including: generating an error correction code based on the S1-channel parallel signals through a forward error correction coding technology; and a packing step, including: taking the S1-channel parallel signals as a signal to be modulated, packing the signal to be modulated with the error correction code to form a first data packet, and incorporating the first number of first signal channels and the first symbol rate to the header information of the first data packet.

In some specific embodiments of the present disclosure, the parsing step includes: taking a number of channels in source channels with signal level changing as the number of first signal channels; and taking a rate of the signal level changing in a signal line as a symbol rate corresponding to the current signal line.

In some specific embodiments of the present disclosure, steps of determining the modulation mode include: solving $$\frac{n}{\log_2 N} \leq 1$$

to obtain a modulation mode number N; wherein, n donates the number of first signal channels; and determining a modulation mode corresponding to the modulation mode number N.

In some specific embodiments of the present disclosure, the packing step includes: packing the signal to be modulated with the error correction code to form the first data packet; and inserting header information in a fixed format in a fixed position of the first data packet; wherein, the header information of the first data packet includes: the first number of first signal channels and the first symbol rate.

In a sixth aspect, the present disclosure provides a signal transmitting method, including: acquiring a first signal from a source; modulating the first signal by a signal sending module to obtain a second signal; wherein, the signal sending module includes a first signal parameter determining module and a PAM-N modulation module, an input end of the first signal parameter determining module is configured to connect to the source for receiving the first signal provided by the source to determine a first number of first signal channels and a first symbol rate; wherein the first number of first signal channels is the quantity of signal channels used by the source, and the first symbol rate is a symbol rate of the first signal; the PAM-N modulation module is connected to the first signal parameter determining module and configured to modulate the first signal to obtain a second signal; transmitting the second signal to a signal receiving module by a signal transmitting cable; demodulating the second signal by the signal receiving module to obtain the first signal; and outputting the first signal to a sink.

In some specific embodiments of the present disclosure, the modulating the first signal by the signal sending module to obtain the second signal includes: parsing the first signal to identify the first number of first signal channels and the first symbol rate; and modulating the first signal to obtain the second signal; wherein, a number of second signal channels is less than or equal to the number of first signal channels.

In some specific embodiments of the present disclosure, the modulating the first signal by the signal sending module to obtain the second signal includes: parsing the first signal to identify the first number of first signal channels and the first symbol rate; and aligning the first signal from M-channel serial signals into M-channel parallel signals, wherein M is a positive integer; generating an error correction code based on the M-channel parallel signals through a forward error correction coding technology; taking the M-channel parallel signals as a signal to be modulated, packing the signal to be modulated with the error correction code to form a first data packet, and incorporating the first number of first signal channels and the first symbol rate into header information of the first data packet; determining a modulation mode of the PAM-N modulation module according to the first number of first signal channels and the first symbol rate; and modulating the packed signal to be modulated based on a determined modulation mode to obtain the second signal; wherein, the number of second signal channels is less than the number of first signal channels.

In some specific embodiments of the present disclosure, after the alignment step, the method includes: shunting the M-channel parallel signals according to the first number of first signal channels and the first symbol rate to form S1-channel parallel signals, wherein S1 is greater than M, and S1 is a positive integer; an error correction code generating step, including: generating an error correction code based on the S-channel parallel signals through a forward error correction coding technology; and a packing step, including: taking the S1-channel parallel signals as a signal to be modulated, packing the signal to be modulated with the error correction code to form a first data packet, and incorporating the first number of first signal channels and the first symbol rate to header information of the first data packet.

In some specific embodiments of the present disclosure, the demodulating the second signal by the signal receiving module to obtain the first signal includes: using a PAM-N demodulation module to demodulate the second signal obtained by the signal transmitting cable to obtain a second data packet; wherein, a demodulation mode of the PAM-N demodulation module is corresponding to the modulation mode of the PAM-N modulation module to the first signal; reading header information of the second data packet to obtain the first number of first signal channels and the first symbol rate; decoding the second data packet into S2-channel parallel signals; wherein S2 is greater than or equal to 1, and S2 is a positive integer; performing error correction decoding on the S2-channel parallel signals based on an error correction code in the second data packet; and multipexing the S2-channel parallel signals after the error correction decoding according to the first number of first signal channels and the first symbol rate to form the first signal, wherein the first signal is M-channel serial signals.

In some specific embodiments of the present disclosure, the demodulating the second signal by the signal receiving module to obtain the first signal includes: using a PAM-N demodulation module to demodulate the second signal obtained by the signal transmitting cable to obtain a second data packet; wherein, a demodulation mode of the PAM-N demodulation module is corresponding to the modulation mode of the PAM-N modulation module to the first signal; reading header information of the second data packet to obtain the first number of first signal channels and the first symbol rate; decoding the second data packet into S2-channel parallel signals; wherein S2 is greater than or equal to 1, and S2 is a positive integer; aligning the S2-channel parallel signals; performing error correction decoding on the aligned S2-channel parallel signals based on an error correction code in the second data packet; and multipexing the S2-channel parallel signals after the error correction decoding according to the first number of first signal channels and the first symbol rate to form the first signal.

In some specific embodiments of the present disclosure, the using the PAM-N demodulation module to demodulate the second signal obtained by the signal transmitting cable to obtain the second data packet includes: adopting a demodulation mode corresponding to the modulation mode of the first signal in the PAM-N modulation module to restore the second signal to a binary signal, and sending the binary signal to a signal unpacking module.

In some specific embodiments of the present disclosure, the multipexing step includes: multipexing the parallel signals after the error correction decoding onto corresponding signal lines with the same number as the first number of first signal channels to form the first signal, and transmitting the first signal on the corresponding signal lines at the first symbol rate to the sink.

In a seventh aspect, the present disclosure provides a signal receiving method, including: obtaining a second signal from a signal transmitting cable; demodulating the second signal by a signal receiving module to obtain a second data packet; reading header information of the second data packet to obtain a first number of first signal channels and a first symbol rate; decoding the second data packet into an unpacked signal; multipexing the unpacked signal according to the first number of first signal channels and the first symbol rate to form a first signal; and outputting the first signal to a sink.

In some specific embodiments of the present disclosure, the unpacked signal is M-channel parallel signals, and M is a positive integer; after decoding the second data packet into the unpacked signal, the method includes: performing error correction decoding on the M-channel parallel signal based on an error correction code in the first data packet; and the multipexing the unpacked signal according to the first number of first signal channels and the first symbol rate to form the first signal includes: multipexing the M-channel parallel signals after the error correction decoding onto corresponding signal lines with the same number as the first number of first signal channels according to the first number of first signal channels and the first symbol rate to form the first signal, and transmitting the first signal on the corresponding signal lines at the first symbol rate to the sink.

In some specific embodiments of the present disclosure, the unpacked signal is S2-channel parallel signals, S2 is greater than or equal to 1, and S2 is a positive integer; after decoding the second data packet into the unpacked signal, the method includes: aligning the S2-channel parallel signals; and performing error correction decoding on the aligned S2-channel parallel signals based on an error correction code in the first data packet; and the multipexing the unpacked signal according to the first number of first signal channels and the first symbol rate to form the first signal includes: multipexing the S2-channel parallel signals after the error correction decoding onto corresponding signal lines with the same number as the first number of first signal channels according to the first number of first signal channels and the first symbol rate to form the first signal, and transmitting the first signal on the corresponding signal lines at the first symbol rate to the sink.

Through the signal sending module provided above, the embodiments of the present disclosure can identify the first number of first signal channels and the first symbol rate through the first signal parameter determining module, so that the PAM-N modulation module selects an adaptive modulation mode to modulate a pulse amplitude of the first signal, and uses the modulation mode to modulate the multi-channel signals in the first signal to form the second signal for signal transmission. Since the modulation processing can reduce the number of signal channels to be transmitted under the condition that the source provides multiple channels of data, the number of wires needed for transmitting the second signal can also be reduced accordingly, thus reducing the transmission cost.

BRIEF DESCRIPTION OF THE DRAWINGS

The above and other objects, features and advantages of the exemplary embodiments of the present disclosure will become more apparent by reading the following detailed description with reference to the drawings. In the accompanying drawings, several embodiments of the present disclosure are illustrated by way of example and not limitation, and the same or corresponding reference numerals indicate the same or corresponding parts, wherein:

FIG. 4 shows a schematic flowchart of a signal transmitting method 400 in some embodiments of the present disclosure;

DETAILED DESCRIPTION

The following clearly and completely describes the technical solutions in the embodiments of the present disclosure with reference to the drawings in the embodiments of the present disclosure. Apparently, the described embodiments are merely some but not all of the embodiments of the present disclosure. Based on the embodiments of the present disclosure, all other embodiments obtained by those skilled in the art without going through any creative work shall fall within the scope of protection of the present disclosure.

It should be understood that the terms "comprising" and "including" used in the specification and claims of the present disclosure indicate the presence of described features, entirety, steps, operations, elements and/or components, but do not exclude the presence or addition of one or more other features, entirety, steps, operations, elements, components and/or collections thereof.

It should also be noted that the terms used in the embodiments and the appended claims of the present disclosure are for the purpose of describing specific embodiments only and are not intended to limit the present disclosure. As use in the specification and claims of the present disclosure, the singular forms "a," "an," and "the" are intended to include the plural forms unless the context clearly indicates otherwise. It should also be further understood that the term "and/or" used in the specification and claims of the present disclosure refers to any combination and all possible combinations of one or more of the associated listed items, and includes these combinations.

As used in the specification and claims, the term "if" can be interpreted as "when" or "once" or "in response to determining" or "in response to detecting" depending on the context. Similarly, the phrases "if determining" or "if [described condition or event] is detected" can be interpreted as meaning "once determined" or "in response to determining" or "once [described condition or event] is detected" or "in response to detecting [described condition or event]" depending on the context.

The specific embodiments of the present disclosure will be further described with reference to the drawings hereinafter.

Figure 1:
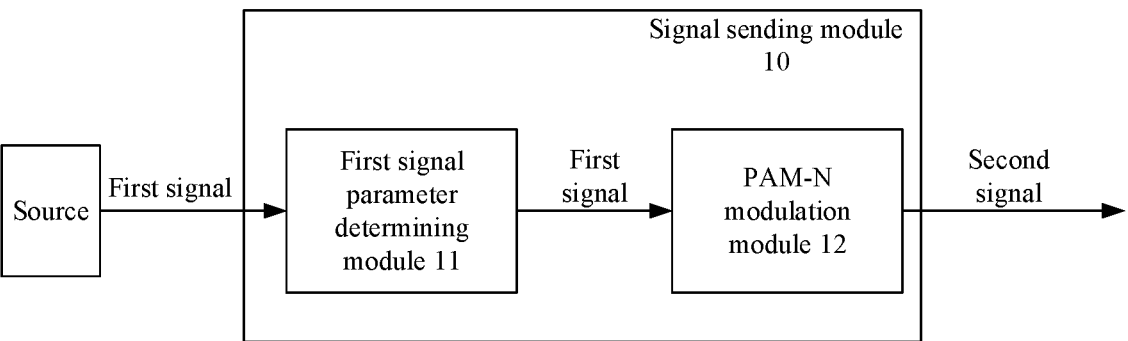
FIG. 1 shows a schematic structural diagram of a signal sending module 10 in some embodiments of the present disclosure.

FIG. 1 shows a schematic structural diagram of a signal sending module 10 in some embodiments of the present disclosure.

As shown in FIG. 1, the present disclosure provides a signal sending module 10, which includes a first signal parameter determining module 11 and a PAM-N modulation module 12.

In a signal transmitting process, the signal sending module 10 in FIG. 1 may receive a first signal from a source, modulate the signal, and then send the modulated signal out. Specifically, an input end of the first signal parameter determining module 11 of the signal sending module 10 is plugged into the source, and after receiving the first signal provided by the source, a first number of first signal channels and a first symbol rate of the first signal are determined. Then, the PAM-N modulation module 12 performs PAM-N modulation processing on the first signal, so that a number of second signal channels output by the PAM-N modulation module 12 is less than or equal to the number of first signal channels.

Figure 5:
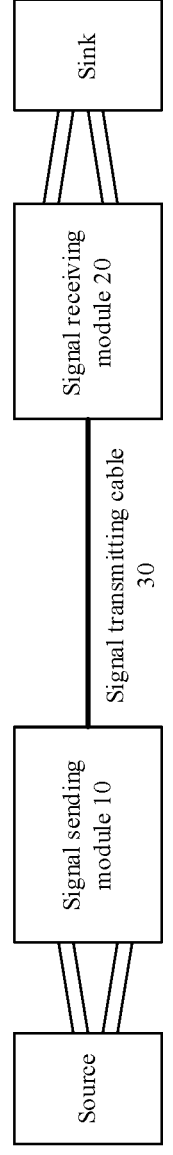
FIG. 5 shows a schematic structural diagram of a signal transmission device in some other embodiments of the present disclosure.

In this embodiment, the first number of first signal channels is the quantity of channels used by the source to provide the first signal, such as a number of metal wires or a number of differential signal pairs between the source and a signal sending module shown in FIG. 5. In this embodiment, the source may transmit the first signal through one metal wire or send the first signal through a plurality of metal wires; and the first symbol rate is a symbol rate of the first signal provided by the source.

In this embodiment, PAM is Pulse Amplitude Modulation, which stands for pulse amplitude modulation. N in the PAM-N represents a modulation mode number, specifically, N different signal levels are used for signal transmission. Taking PAM-4 as an example, four different signal levels are adopted for signal transmission, and each symbol period can represent two bits of information. Taking PAM-8 as another example, in a pulse amplitude modulation mode of PAM-8, eight different signal levels are adopted for signal transmission, and each symbol period can represent three bits of information. Similarly, PAM-N may also be PAM-16 and so on, which will not be described here.

In the embodiments of the present disclosure, there are several modulation situations: firstly, the source uses a single channel to transmit the first signal, and the PAM-N modulation module still transmits a second signal after modulation through the single channel; secondly, the source uses multiple channels to transmit the first signal, and the PAM-N modulation module modulates the first signal and then outputs the second signal, which can be transmitted through the single channel, thus realizing wire reduction of a signal transmitting cable; and thirdly, the source uses multiple channels to transmit the first signal, and the PAM-N modulation module modulates the first signal and then outputs the second signal, which is also transmitted through the multiple channels, but a number of channels used by the second signal is less than that used by the first signal, thus realizing the wire reduction of the signal transmitting cable.

It should be further noted that a symbol rate of the first signal provided by the source mentioned above and a symbol rate of the second signal output by the PAM-N modulation module may be the same or different, for example, the symbol rate of the second signal output by the PAM-N modulation module may be less than or equal to the first symbol rate of the first signal.

For example, in order to realize that the symbol rate of the second signal is less than or equal to the first symbol rate, a modulation mode number N can be obtained by solving an equation $$\frac{n}{\log_2 N} \le 1$$

to determine a modulation mode of the PAM-N modulation module, wherein n donates the number of first signal channels.

For example, if the source provides the first signal through two channels and adopts a modulation mode of PAM-4, then the PAM-N modulation module can modulate the first signal into a single-channel second signal, and $$\frac{n}{\log_2 N} = \frac{2}{\log_2 4} = 1,$$

which means that the symbol rate of the second signal remains unchanged compared with the first symbol rate; if the source provides the first signal through two channels and adopts a modulation mode of PAM-16, then the PAM-N modulation module can modulate the first signal into a single-channel second signal, and $$\frac{n}{\log_2 N} = \frac{2}{\log_2 16} = \frac{1}{2},$$

which means that the symbol rate of the second signal is halved compared with the first symbol rate.

Figure 2:
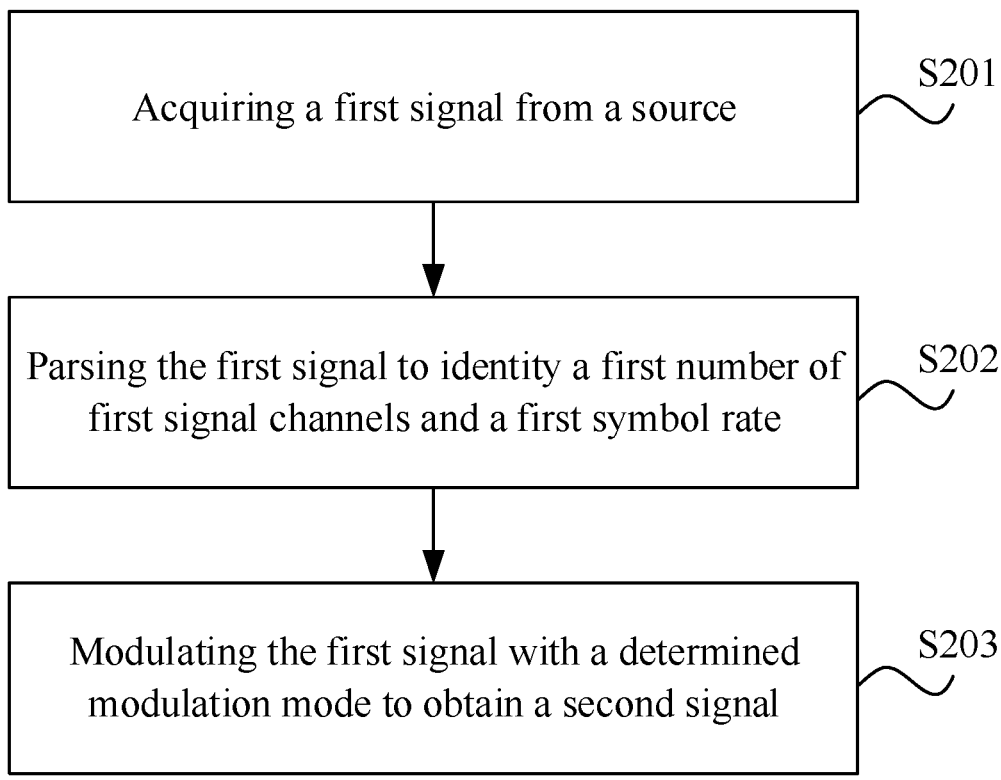
FIG. 2 shows a schematic flowchart of a signal sending method 200 in some embodiments of the present disclosure.

Based on the signal sending module 10 shown in FIG. 1, the present disclosure also provides a signal sending method as shown in FIG. 2. FIG. 2 shows a schematic flowchart of a signal sending method 200 provided by some embodiments of the present disclosure.

As shown in FIG. 2, in step S201, a first signal is acquired from a source.

In some embodiments, the first signal output by the source may enter the first signal parameter determining module 11 and the PAM-N modulation module 12 in FIG. 1 respectively. The first signal is a high-speed signal, which includes a multimedia signal and/or a clock signal.

Further, the first signal in the embodiments of the present disclosure is transmitted through an HDMI interface or a DP interface, and if transmitted through an HDMI1.4interface or an HDMI2.0 interface, the first signal may include a multimedia signal and a clock signal; if transmitted through an HDMI2.1 interface or a DP interface, the first signal may include a multimedia signal. The multimedia signal refers to a video signal and/or an audio signal.

In step S202, the first signal is parsed to identity a first number of first signal channels and a first symbol rate.

In this embodiment, the first signal parameter determining module 11 performs the parsing step, which is step S202, so as to obtain information of the first number of first signal channels and the first symbol rate.

Specifically, the first signal parameter determining module 11 may take a number of channels with signal level changes in source channels as the number of first signal channels, and in each channel, a rate of the signal level changes in a signal line is taken as a symbol rate corresponding to the current signal line. Alternatively, the first signal parameter determining module 11 knows the first number of first signal channels and the corresponding symbol rate based on pre-configuration. Still alternatively, the first signal parameter determining module 11 obtains the first number of first signal channels and the corresponding symbol rate from information provided by the source (for example, through a low-speed signal line connected to the source).

In step S203, the first signal is modulated with a determined modulation mode to obtain a second signal.

Further, in a signal sending process, the first signal parameter determining module 11 can identify changes in the first number of first signal channels and/or the first symbol rate, and accordingly, the PAM-N modulation module 12 is used to change the modulation mode according to an identification result of the first signal parameter determining module 101 to adapt to the changes of the first number of first signal channels and/or the first symbol rate.

Specifically, in step S203, the modulation mode of the PAM-N modulation module 102 can be determined by the following methods:

solving $$\frac{n}{\log_2 N} \le 1$$

to obtain a modulation mode number N; wherein, n donates the number of first signal channels; and determining a modulation mode corresponding to the modulation mode number N.

It should be noted that in some embodiments, in the case that the first number of first signal channels n is fixed, a value range of N can be solved according to an inequality $$\frac{n}{\log_2 N} \leq 1,$$

that is, several optional modulation modes in practical application can be obtained, and then one modulation mode can be determined from the several optional modulation modes. In other embodiments, if the modulation mode can also be determined according to a variation of the symbol rate, for example, the symbol rate of the modulated signal is required to be halved, then the equation $$\frac{n}{\log_2 N} = \frac{1}{2}$$

can be solved, so that the determined value of N can be obtained, and thus the determined modulation mode can be obtained. In a still alternative embodiment, the PAM-N modulation module 102 adopts a predetermined modulation mode, for example, N=4, 8 or 16, without changing the modulation mode according to the first number of first signal channels n.

Figure 3:
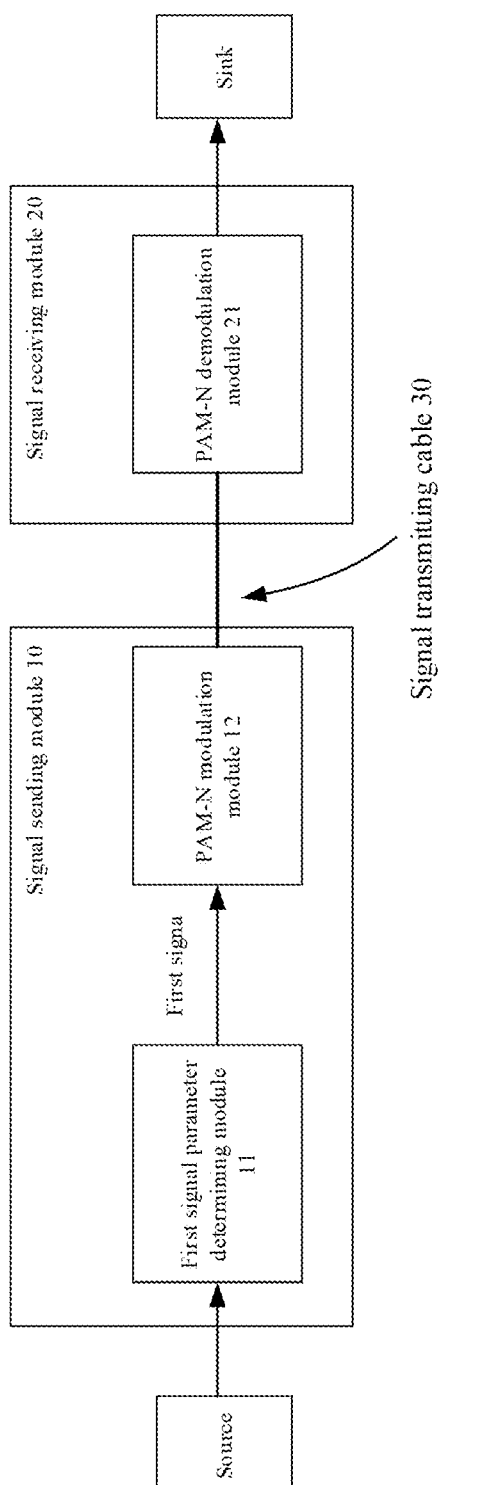
FIG. 3 shows a schematic structural diagram of a signal transmission device in some embodiments of the present disclosure.

Based on the signal sending module 10 provided in the previous embodiment, the present disclosure also provides a signal transmission device as shown in FIG. 3. FIG. 3 shows a structural schematic diagram of the signal transmission device in some embodiments of the present disclosure. The signal transmission device as shown in FIG. 3 includes the signal sending module 10 shown in FIG. 1, a signal transmitting cable 30 and a signal receiving module 20.

The signal receiving module 20 includes: a PAM-N demodulation module 21, wherein an input end of the PAM-N demodulation module 21 is configured to connected to the signal transmitting cable 30. A second signal sent by the signal sending module 10 is transmitted to the signal receiving module 20 through the signal transmitting cable 30, and the PAM-N demodulation module 21 is used to demodulate the second signal. During demodulation, a demodulation mode code of the PAM-N demodulation module 21 corresponds to a modulation mode code used by the PAM-N modulation module 12 on the first signal, so as to restore the second signal to the first signal later.

Based on the signal transmission device shown in FIG. 3, the embodiments of the present disclosure provide a signal transmitting method as shown in FIG. 4. FIG. 4 shows a schematic flowchart of a signal transmitting method 40 in some embodiments of the present disclosure.

As shown in FIG. 4, in step S401, a signal sending module acquires a first signal from a source.

In step S402, the signal sending module modulates the first signal to obtain a second signal.

In this embodiment, the specific execution contents of step S401 and step S402 may be referred to the specific description in the embodiment shown in FIG. 2, and will not be repeated here.

In step S403, the signal transmitting cable transmits the second signal to a signal receiving module.

Figure 6:
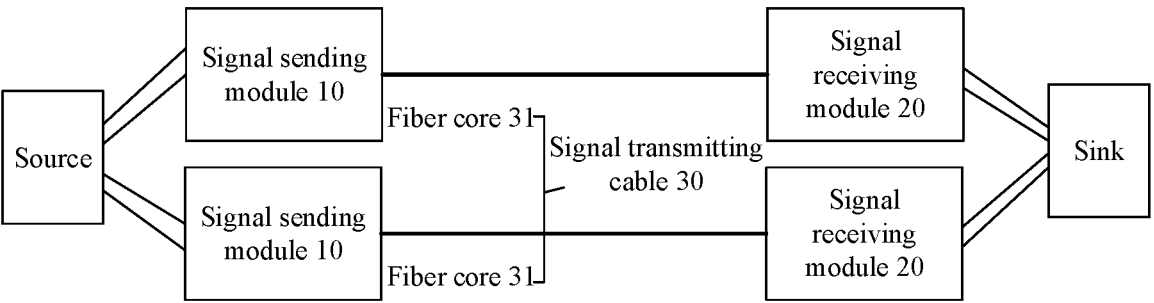
FIG. 6 shows a schematic structural diagram of a signal transmission device in some other embodiments of the present disclosure.

In an alternative embodiment, the signal transmitting cable 30 may include one or plurality of cores 31. When the signal transmitting cable only includes one core, the signal transmission device uses one signal sending module and one signal receiving module, and completes signal transmitting through one core. In this case, a structure of the signal transmission device may be shown in FIG. 5. FIG. 5 shows a schematic structural diagram of a signal transmission device in some other embodiments of the present disclosure. When the signal transmitting cable includes a plurality of cores, the signal transmission device uses a plurality of signal sending modules and the same number of signal receiving modules, and completes signal transmitting through the same number of cores. In this case, the structure of the signal transmission device may be shown in FIG. 6. FIG. 6 shows a structural schematic diagram of a signal transmission device in some other embodiments of the present disclosure.

Further, in this embodiment, the core is made of copper wire.

In step S404, the signal receiving module demodulates a second signal to obtain a first signal.

In a modulation process, a demodulation mode used by a PAM-N demodulation module 21 is corresponding to a modulation mode code used by a PAM-N modulation module 12 on the first signal.

In step S405, the signal receiving module outputs the first signal to a sink.

Through the signal transmission device and the signal transmitting method in the previous embodiments, the signal sending module may modulate the multi-channel first signal provided by the source into the second signal with fewer channels, such as the single-channel second signal, thereby reducing the number of cores needed for signal transmitting, reducing a diameter of the signal transmitting cable and reducing a signal transmitting cost.

In signal transmitting, a Bit Error Ratio (BER) of the sink may be affected by transmitting channel noise, interference, distortion, bit synchronization problems, attenuation and wireless multipath fading, resulting in signal damage. In order to ensure that the BER of the sink meets specification requirements, Forward error correction (FEC) technology is adopted in some embodiments of the presents disclosure.

Due to errors or other reasons, the signals of multiple channels provided by the source may not arrive at the same time. Therefore, some embodiments of the present disclosure also set a signal alignment module to align the signals of multiple channels in time.

A number of channels connecting the source may vary (for example, one channel, two channels, four channels, etc.), and a rate of the first signal provided by the source may also vary.

Figure 7:
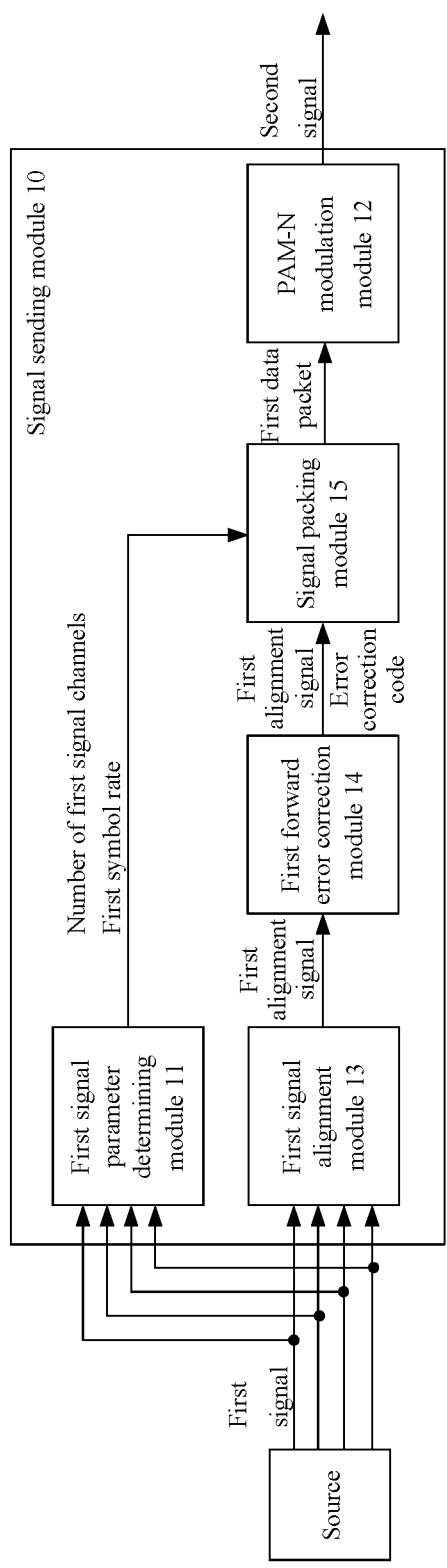
FIG. 7 shows a schematic structural diagram of a signal sending module 10 in some other embodiments of the present disclosure.
Figure 8:
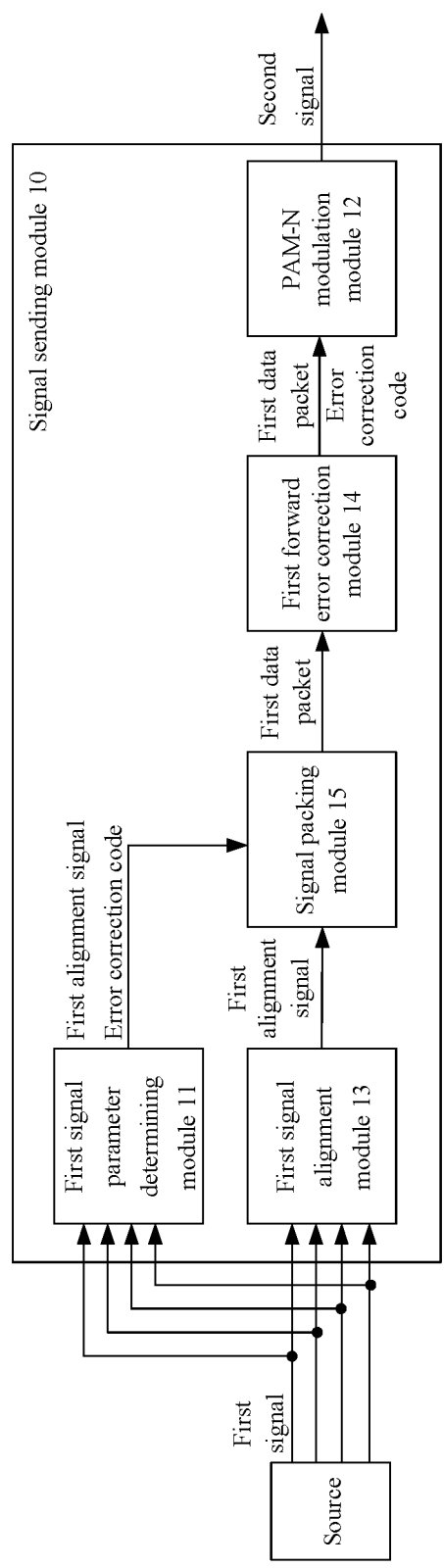
FIG. 8 shows a schematic structural diagram of a signal sending module 10 in some other embodiments of the present disclosure.

In order to adapt to various possible situations at the source, some embodiments of the present disclosure provide a signal sending module as shown in FIG. 7 or FIG. 8. FIG. 7 shows a schematic structural diagram of a signal sending module in some embodiments of the present disclosure. FIG. 8 shows a schematic structural diagram of a signal sending module in some embodiments of the present disclosure. On the basis of the signal sending module 10 shown in FIG. 1, the signal sending module 10 shown in FIG. 7 and FIG. 8 is additionally provided with a first signal alignment module 13, a first forward error correction module 14 and a signal packing module 15.

In the signal sending module shown in FIG. 7, an input end of the first signal alignment module 13 is configured to connected to the source direct, an output end of the first signal alignment module is directly connected with an input end of the first forward error correction module 14, an output end of the first forward error correction module 14 is connected to an input end of the signal packing module 15, and an output end of the signal packing module 15 is connected to an input end of the PAM-N modulation module 12. Moreover, an output end of the first signal parameter determining module 11 will be connected to the input end of the signal packing module 15.

In a signal sending module, the first signal alignment module 13 time aligns the multi-channel first signals sent by the source, thereby forming a first aligned signal. As an example, the first aligned signal is formed by applying different delays to the first signal of each channel. As another example, caches with specified sizes are provided for the first signals of each channel, and cached data are taken as the first aligned signal with frame or beat granularity, and the whole cached data are provided to the first forward error correction module 14 (FIG. 7) or the signal packing module 15 (FIG. 8) at the same time to realize signal alignment. In one frame or one beat, a certain channel may have no data, and the corresponding cache is empty or marked with a specified value. A size of the cache may be adapted to size needed by the respective operations of the first forward error correction module 14 or the signal packing module 15.

After the first aligned signal is input to the first forward error correction module 14, the first forward error correction module 14 generates an error correction code according to the first aligned signal, and the error correction code will be input to the signal packing module 15 together with the first aligned signal, and the first aligned signal in this case will be packed into a first data packet as a signal to be modulated. At the same time, the first number of first signal channels and the first symbol rate identified by the first signal parameter determining module 11 will be incorporated to header information of the first data packet.

Alternatively, the first forward error correction module 14 includes a plurality of encoder circuits that can work simultaneously. The encoder circuit generates an error correction code for input data according to a preset FEC coding algorithm or coding mode. As an example, a size of the input data of each encoder circuit is a cache size used by the first signal alignment module 13. Alternatively, the cache size is an integer multiple of the size of the input data of the encoder circuit. Still alternatively, the first forward error correction module 14 also interleaves the first aligned signals of multiple channels. The interleaved data are divided according to the size of the input data of the encoder circuit and provided to each encoder circuit. Still alternatively, all the encoder circuits of the first forward error correction module 14 work at the same time to perform FEC coding on the first aligned signal at the same time, and ensure that all data carried by the first aligned signal are packed in the same data packet by the signal packing module 15. Still alternatively, the same data packet may include data carried by the first aligned signal or a plurality of alignment signals.

Still alternatively, for the multi-channel first signals sent by the source, a size of a data block to be processed by the first forward error correction module on each channel is determined by a processing capacity of the first forward error correction module 14. Assuming that the first number of first signal channels is 4, if the first forward error correction module 14 can process 16 channels of signals, each channel needs m-bit signal data, then total signal data that the first forward error correction module 14 can process is 16m-bit. Accordingly, the first signal alignment module 13 may acquire 4m bits of signal data from each channel at a time and then process the data.

In some embodiments, positions of the first forward error correction module 14 and the signal packing module 15 can be switched to form the signal transmission device shown in FIG. 8.

Specifically, in the signal sending module shown in FIG. 8, the input end of the first signal alignment module 13 is connected to the source, and the output end of the first signal alignment module is connected with the input end of the signal packing module 15, the output end of the signal packing module 15 is connected with the input end of the first forward error correction module 14, and the output end of the first forward error correction module 14 is connected with the input end of the PAM-N modulation module 12. Moreover, the output end of the first signal parameter determining module 11 is still connected to the input end of the signal packing module 15.

In this case, in the signal sending module 10, the first signal alignment module 13 aligns the multi-channel first signals sent by the source in time to form a first aligned signal, and the first aligned signal is input to the signal packing module 15 and packed into a first data packet as a signal to be modulated. Meanwhile, a first number of first signal channels and a first symbol rate obtained by the first signal parameter determining module 11 will be incorporated to header information of the first data packet. The first data packet will be input to the first forward error correction module 14, and the first forward error correction module generates an error correction code and incorporates the error correction code into the first data packet.

On the basis of the signal sending module shown in FIG. 7 or FIG. 8, the present disclosure also provides a signal sending method, which specifically includes the following steps of:

acquiring a first signal from a source;

parsing the first signal by a first signal parameter determining module 11 to identify a first number of first signal channels and a first symbol rate; and aligning the first signal from M-channel serial signals into M-channel parallel signals by the first signal alignment module 13. Alternatively, in order to adapt to a first forward error correction module 14 and facilitate the processing of each encoder circuit of the forward error correction module 14, the first signal alignment module 14 further divides the M-channel parallel signals into S-channel parallel signals, so that each of the S-channel parallel signals corresponds to one of the encoder circuits. Still alternatively, the M-channel parallel signal or the S-channel parallel signals are simultaneously processed by the first forward error correction module 14.

The first forward error correction module 14 generates an error correction code based on the M-channel parallel signals or the S-channel parallel signals through a forward error correction coding technology.

The signal packing module 15 takes the M-channel parallel signals or the S-channel parallel signals as a signal to be modulated, packages the signal to be modulated and the error correction code to form a first data packet, and incorporates the first number of first signal channels and the first symbol rate to header information of the first data packet. Alternatively, the first aligned signal (including M-channel parallel signals or S-channel parallel signals) within a single time granularity is called one frame of data, and the first data packet includes data from one or more frames.

A PAM-N modulation module 12 modulates the packed signal to be modulated with a determined modulation mode to obtain a second signal. The second signal is transmitted on a wire core.

When parsing the first signal, the first signal parameter determining module 11 takes a number of channels with signal level changes in source channels as the number of first signal channels, and takes a rate of the signal level changes in a signal line as a symbol rate corresponding to the current signal line.

The packing step performed by the signal packing module 15 may further include: packing the signal to be modulated and the error correction code to form the first data packet, and then inserting the header information of the specified format in a specified position of the first data packet, wherein the header information of the first data packet includes the first number of first signal channels and the first symbol rate.

Figure 9:
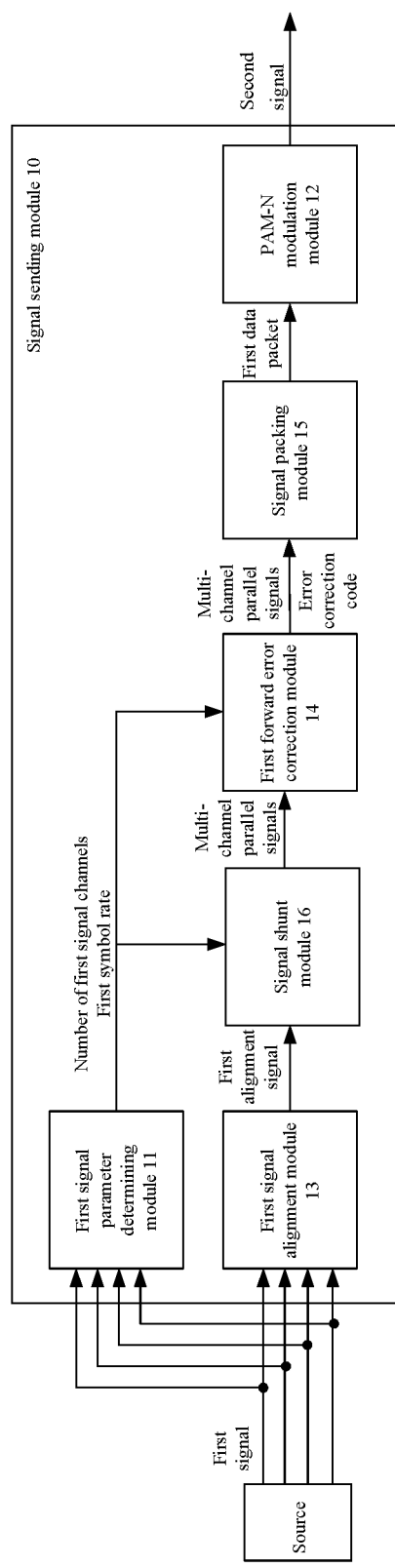
FIG. 9 shows a schematic structural diagram of a signal sending module 10 in some other embodiments of the present disclosure.
Figure 10:
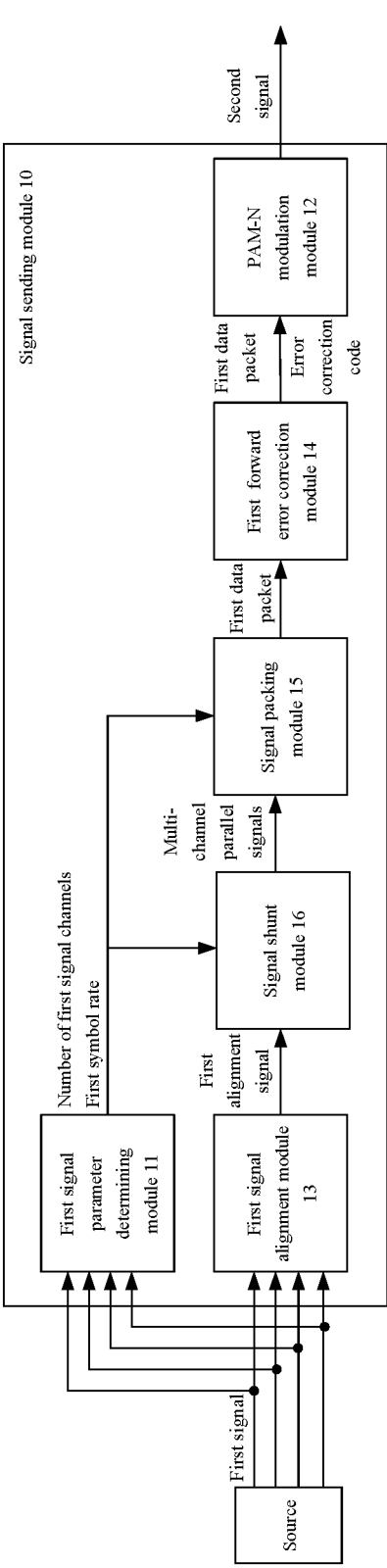
FIG. 10 shows a schematic structural diagram of a signal sending module 10 in some other embodiments of the present disclosure.

The structure and signal sending method of the signal sending module shown in FIG. 7 and FIG. 8 are described above. In other embodiments of the present disclosure, the signal sending module may also be provided with a signal shunt module to complete signal shunting. FIG. 9 shows a schematic structural diagram of a signal sending module 10 in some other embodiments of the present disclosure. FIG. 10 shows a schematic structural diagram of a signal sending module 10 in some other embodiments of the present disclosure.

As shown in FIG. 9 or FIG. 10, the signal sending module 10 may also include a signal shunt module 16, where input ends of which are connected to a first signal alignment module 13 and a first signal parameter determining module 11, and an output end of the signal shunt module 16 is also connected to an input end of a first forward error correction module 14. The signal shunt module 16 is configure to realize serial-parallel conversion, adapt with a bandwidth of a PAM-N modulation module 12, and/or a number of encoder circuits of a forward error correction module and a sum of size of input data of the encoder circuits. For example, the signal shunt module 16 can shunt a first aligned signal into multi-channel parallel signals according to a first number of first signal channels and a first symbol rate identified by a first signal parameter determining module 11, so that an integer multiple of the data carried by the multi-channel parallel signals can be carried by a single data packet. The first forward error correction module 14 generates an error correction code according to the multi-channel parallel signals. Still alternatively, the signal shunt module 16 shunts the M-channel parallel signal into S channels, while accordingly, the number of the encoder circuits of the forward error correction module 14 are also S.

Still alternatively, the signal shunt module 16 is also configured to realize serial-parallel conversion of signals. In the case that the first signal alignment module 13 adjusts delay of the M-channel serial signals to align the M-channel serial signals in time, the signal shunt module 16 converts the M-channel serial signals into M-channel parallel signals, and alternatively or further converts the M-channel serial signals into S-channel parallel signals.

In some embodiments, because positions of the first forward error correction module 14 and the signal packing module 15 can be switched, there are two direct and indirect connection modes between the signal shunt module 16 and the first forward error correction module 14. Specifically, as shown in FIG. 9, when the first forward error correction module 14 and the signal packing module 15 are connected in the mode shown in FIG. 7, the output end of the signal shunt module 16 is directly connected to the input end of the first forward error correction module 14. As shown in FIG. 10, when the first forward error correction module 14 and the signal packing module 15 are connected in the mode shown in FIG. 8, the output end of the signal shunt module 16 is indirectly connected to the input end of the first forward error correction module 14.

Similar to the previous embodiment, a data block size of each parallel signal to be processed by the first forward error correction module is limited by a processing capacity of the first forward error correction module 14. Still assuming that the first forward error correction module 14 can process 16 channels of signals, each channel needs m bits of signal data, then a total amount of signal data that the first forward error correction module 14 can process at the same time is 16m-bit, so a total amount of data of the multiple parallel signals is also required to be 16m-bit. The number of signal channels that the first forward error correction module 14 can process determines the number of channels of the multi-channel parallel signals formed by the signal shunt module 16.

On the basis of the signal sending module shown in FIG. 9 or FIG. 10, the present disclosure also provides a signal sending method as shown below, including:

acquiring a first signal from a source;

parsing the first signal by a first signal parameter determining module 11 to identify a first number of first signal channels and a first symbol rate;

aligning the first signal from M-channel serial signals into M-channel parallel signals by the first signal alignment module 13;

shunting the M-channel parallel signal by a signal shunt module 16 according to a first number of first signal channels and a first symbol rate and/or according to a processing capacity of a first forward error correction module 14 to form S1-channel parallel signals; wherein S1 is greater than M, and S1 is a positive integer;

generating an error correction code by a first forward error correction module 14 based on the S1-channel parallel signals through a forward error correction coding technology;

taking the S1-channel parallel signals as a signal to be modulated by a signal packing module 15, packing the signal to be modulated and the error correction code to form a first data packet, and incorporating the first number of first signal channels and the first symbol rate to header information of the first data packet; and modulating the packed signal to be modulated by a PAM-N modulation module 12 with a determined modulation mode to obtain a second signal.

It should be noted that in the above signal sending process, M represents the number of first signal channels, that is, the number of channels used by the source to provide the first signal.

Compared with the signal sending method corresponding to the signal sending module shown in FIG. 7 and FIG. 8, the signal sending method corresponding to the signal sending module shown in FIG. 9 and FIG. 10 performs signal shunting after the alignment step, thus forming the S1-channel parallel signals. It should be noted that, similar to M, a value of S1 is limited by the processing capacity of the first forward error correction module 14. Please refer to the detailed description in the embodiment shown in FIG. 7 above, which will not be repeated here.

Adapting to the signal sending module provided by the previous embodiments, some embodiments of the present disclosure improve the signal receiving module 20 in FIG. 3.

Figure 11:
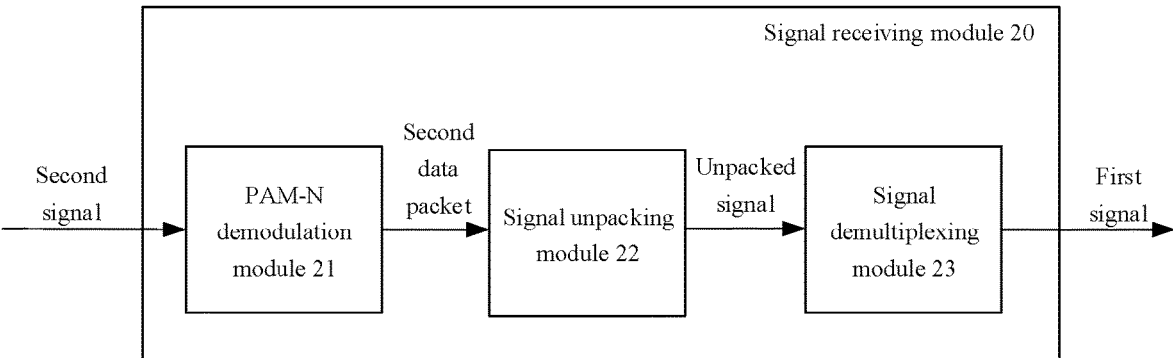
FIG. 11 shows a schematic structural diagram of a signal receiving module 20 in some embodiments of the present disclosure.

Some embodiments of the present disclosure provide a signal receiving module as shown in FIG. 11, which is additionally provided with a signal unpacking module 22 and a signal demultiplexing module 23 on the basis of the signal receiving module 20 of FIG. 3. An input end of the signal unpacking module 22 is connected to an output end of the PAM-N demodulation module 21, an output end of the signal unpacking module 22 is connected to an input end of the signal demultiplexing module 23, and an output end of the signal demultiplexing module 23 is configured to connected to a sink.

The PAM-N demodulation module 21 receives a second signal transmitted by the signal transmitting cable and demodulates the second signal to obtain a second data packet, the signal unpacking module 22 receives the second data packet, reads header information of the second data packet to obtain a first number of first signal channels and a first symbol rate, decodes the second data packet into an unpacked signal, and inputs the unpacked signal to the signal demultiplexing module 23. The signal demultiplexing module 23 takes the unpacked signal as a signal to be demultiplexed according to the first number of first signal channels and the first symbol rate, demultiplexes the signal to be demultiplexed onto corresponding signal lines with the same number as the first number of first signal channels to form a first signal, and transmits the first signal on the corresponding signal lines at the first symbol rate.

The signal demultiplexing module 23 distributes the unpacked signal to each channel connected with the sink.

It should be further explained that in the signal demultiplexing process, the channel where each signal is located in the signal receiving module should correspond to the channel where each signal is located in the signal sending module (that is, the signal received from a first channel at a source should be provided to a first channel connected with the sink; while a signal received from an $i^{th}$ channel of the source should be provided to an $i^{th}$ channel connected with the sink. Moreover, on each channel connecting the source and the sink, frames of the signal in time should also correspond to each other. A signal received from each channel in an $f^{th}$ frame at the source needs to be provided to the sink in the same frame of each channel at the sink). Therefore, the signal demultiplexing module 23 needs to perform the signal demultiplexing process under the control of a second signal parameter determining module. The second signal parameter determining module provides channel information of the first signal including the number of first signal channels.

On the basis of this, some embodiments of the present disclosure further provide a signal receiving method, including the following steps of:

obtaining a second signal from a signal transmitting cable;

demodulating the second signal by using a PAM-N demodulation module in a signal receiving module to obtain a second data packet;

reading header information of the second data packet to obtain a first number of first signal channels and a first symbol rate;

using a signal unpacking module to decode the second data packet into an unpacked signal;

using a signal demultiplexing module to demultiplex the unpacked signal according to the first number of first signal channels and the first symbol rate to form a first signal; and outputting the first signal to a sink.

It can be understood that according to any signal sending module 10 shown in FIG. 3, and FIG. 7 to FIG. 10, and the signal receiving module 20 shown in FIG. 11, a plurality of signal transmission devices can be formed.

Figure 12:
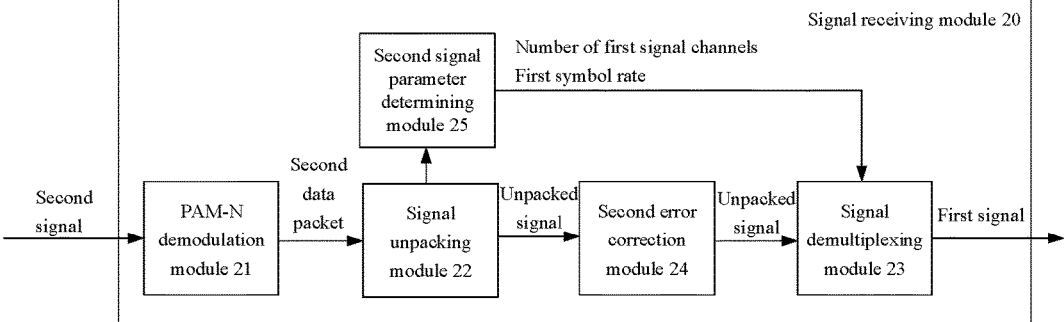
FIG. 12 shows a schematic structural diagram of a signal receiving module 20 in some other embodiments of the present disclosure.

Some embodiments of the present disclosure further provide another signal receiving module adaptive with the signal sending module shown in FIG. 7 and FIG. 8. FIG. 12 shows a schematic structural diagram of a signal receiving module 20 in some other embodiments of the present disclosure.

The signal receiving module shown in FIG. 12 is additionally provided with a second forward error correction module 24 and a second signal parameter determining module 25 on the basis of the signal receiving module shown in FIG. 11. An input end of the second forward error correction module 24 is connected to a signal unpacking module 22, and the second forward error correction module is configured to perform error correction decoding on an unpacked signal based on an error correction code in a second data packet. An input end of the second signal parameter determining module 25 is connected to an output end of the signal unpacking module 22, an output end of the second signal parameter determining module 25 is connected to a signal demultiplexing module 23, and the second signal parameter determining module is configured to identify a first number of first signal channels and a first symbol rate from an header information provided by the signal unpacking module 22. Moreover, under the control of the second signal parameter determining module 25, the signal demultiplexing module 23 can demultiplex the unpacked signal according to the first number of first signal channels and the first symbol rate to form a first signal.

The signal transmission device formed by the signal sending module shown in FIG. 7 or FIG. 8 and the signal receiving module shown in FIG. 12 may complete signal transmitting according to the following steps:

acquiring a first signal from a source;

parsing the first signal to identify a first number of first signal channels and a first symbol rate;

aligning the first signal from M-channel serial signals into M-channel parallel signals;

generating an error correction code based on the M-channel parallel signals through a forward error correction coding technology;

taking the M-channel parallel signals as a signal to be modulated, packing the signal to be modulated with the error correction code to form a first data packet, and incorporating the first number of first signal channels and the first symbol rate to header information of the first data packet;

modulating the packed signal to be modulated with a determined modulation mode to obtain a second signal;

transmitting the second signal to the signal receiving module by a signal transmitting cable;

demodulating the second signal obtained from the signal transmitting cable by using a PAM-N demodulation module to obtain a second data packet;

reading header information of the second data packet to obtain a first number of first signal channels and a first symbol rate;

decoding the second data packet into S2-channel parallel signals, wherein S2 is greater than or equal to 1, and S2 is a positive integer; wherein a value of S2 depends on a number of decoder circuits in a second forward error correction module 24 (for example, S2, or S2 is a multiple of the number of decoder circuits);

performing error correction decoding on the S2-channel parallel signals based on the error correction code in the second data packet; and multiplexing the S2-channel parallel signals after the error correction decoding according to the first number of first signal channels and the first symbol rate to form a first signal, wherein the first signal is M-channel serial signals.

In the above-mentioned signal transmitting process, a demodulation mode of the PAM-N demodulation module is corresponding to a modulation mode of a PAM-N modulation module to the first signal. Specifically, the PAM-N demodulation module adopts a demodulation mode corresponding to the modulation mode of the PAM-N modulation module to the first signal, restores the second signal into a binary signal, and sends the binary signal to the signal unpacking module. Alternatively, the PAM-N demodulation module and the PAM-N modulation module adopt the same modulation mode (represented by a value of N), and the adopted modulation module may be specified or configured in advance. Still alternatively, the PAM-N modulation module selects or adjusts the modulation module adopted according to a number of signal channels and/or a symbol rate of the source, and the modulation mode information need not be explicitly transferred to the PAM-N demodulation module through a cable, but is determined by the PAM-N demodulation module from the second signal through, for example, limited attempts. Still alternatively, the signal sending module transfers the modulation mode N to the PAM-N demodulation module in an out-of-band manner.

The signal demultiplexing module 23 executes a demultiplexing action according to the following steps: demultiplexing the parallel signals after the error correction decoding onto corresponding signal lines with the same number as the first number of first signal channels to form a first signal, and outputting the first signal on the corresponding signal lines at the first symbol rate to the sink.

Figure 13:
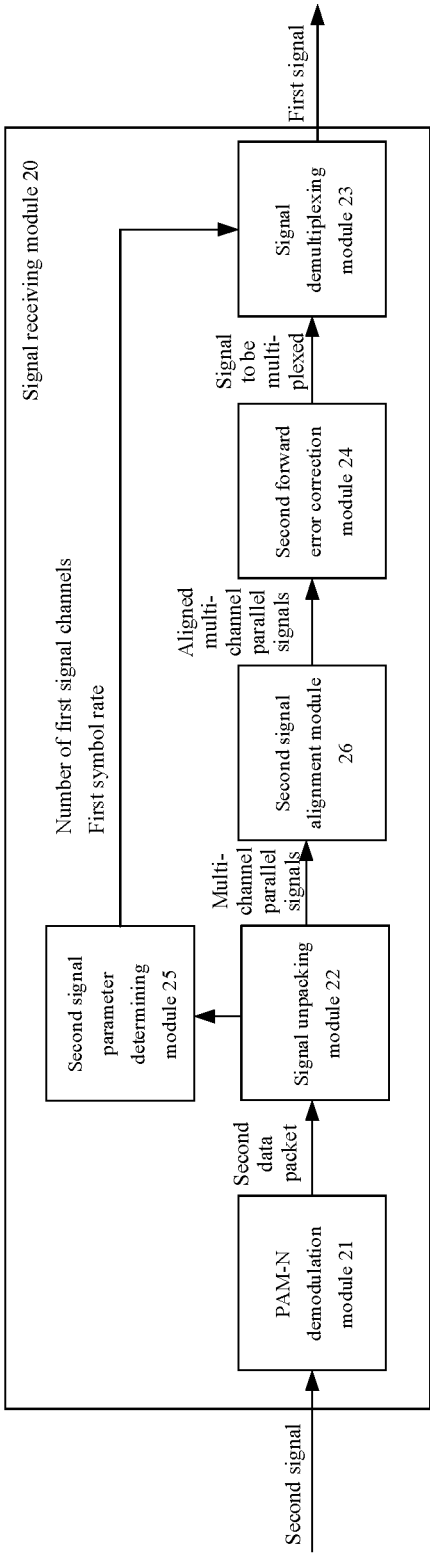
FIG. 13 shows a schematic structural diagram of a signal receiving module 20 in some other embodiments of the present disclosure.

Some embodiments of the present disclosure further provide another signal receiving module adaptive with the signal sending module shown in FIG. 9 and FIG. 10. FIG. 13 shows a schematic structural diagram of a signal receiving module 20 in some other embodiments of the present disclosure.

The signal receiving module shown in FIG. 13 is additionally provided with a second signal alignment module 26 on the basis of the signal receiving module shown in FIG. 12. An input end of the second signal alignment module 26 is connected to an output end of a signal unpacking module 22, and an output end of the second signal alignment module 26 is connected to an input end of a second forward error correction module 24, and the second signal alignment module is configured to align multi-channel parallel signals output from a signal unpacking module in time. Therefore, a signal demultiplexing module 23 is convenient to transmit data belonging to the same frame in time simultaneously on multiple channels connecting a sink. When a single second data packet includes multiple frames of data, the second signal alignment module 26 also frames S2-channel parallel signals to determine data frames to which each channel of data provided to the sink belongs. Still alternatively, the second signal alignment module 26 also ensures that the S2-channel parallel signals are provided to each decoder circuit of the second forward error correction module 24 at the same time, so that the S2-channel parallel signals can be decoded at the same time, so that multi-channel (e.g., S2 channels) signals to be multiplexed can be provided to the signal demultiplexing module 23 at the same time.

In this case, the second forward error correction module is configured to perform error correction decoding on the aligned multi-channel parallel signals according to an error correction code in a second data packet, and the signal demultiplexing module is configured to take the multi-channel parallel signals after the error correction decoding as a signal to be demultiplexed.

The signal transmission device formed by the signal sending module shown in FIG. 9 or FIG. 10 and the signal receiving module shown in FIG. 13 may complete signal transmitting according to the following steps:

acquiring a first signal from a source;

parsing the first signal to identify a first number of first signal channels and a first symbol rate;

aligning the first signal from M-channel serial signals into M-channel parallel signals;

shunting the M-channel parallel signal according to the first number of first signal channels and the first symbol rate to form S1-channel parallel signals;

generating an error correction code based on the S1-channel parallel signals through a forward error correction coding technology;

taking the S1-channel parallel signals as a signal to be modulated, packing the signal to be modulated with the error correction code to form a first data packet, and incorporating the first number of first signal channels and the first symbol rate to header information of the first data packet;

modulating the packed signal to be modulated with a determined modulation mode to obtain a second signal;

transmitting the second signal to the signal receiving module by a signal transmitting cable;

demodulating the second signal obtained from the signal transmitting cable by using a PAM-N demodulation module to obtain a second data packet;

reading header information of the second data packet to obtain a first number of first signal channels and a first symbol rate;

decoding the second data packet into S2-channel parallel signals;

aligning the S2-channel parallel signals;

performing error correction decoding on the aligned S2-channel parallel signals based on the error correction code in the second data packet; and multiplexing the S2-channel parallel signals after the error correction decoding according to the first number of first signal channels and the first symbol rate to form the first signal.

It should be noted that in the above-mentioned signal receiving process, a value of S2 in the S2-channel parallel signals depends on a number of signal channels that can be processed by the second forward error correction module (or the number of decoder circuits included in the second forward error correction module). After being processed by the signal demultiplexing module, the S2-channel parallel signals after the error correction and decoding are still aligned in time when transmitted on the signal lines.

It should be further noted that in the process of signal transmitting executed by the signal sending module formed by the signal sending module shown in FIG. 9 or FIG. 10 and the signal receiving module shown in FIG. 13, a value of S1 is equal to the value of S2, that is, the number of signal channels that can be processed by the first forward error correction module in the signal sending module is the same as the number of signal channels that can be processed by the second forward error correction module. Alternatively, S1 and S2 may be different, that is, the number of encoder circuits of the first forward error correction module is different from the number of decoder circuits of the second forward error correction module.

According to the signal transmission device shown in FIG. 6, it can be known that in practical application, the signal transmitting cable may include a plurality of cores, that is, the second signal may be transmitted simultaneously through the plurality of cores. It should be noted that in practical application, the core may be made of a copper wire.

Figure 14:
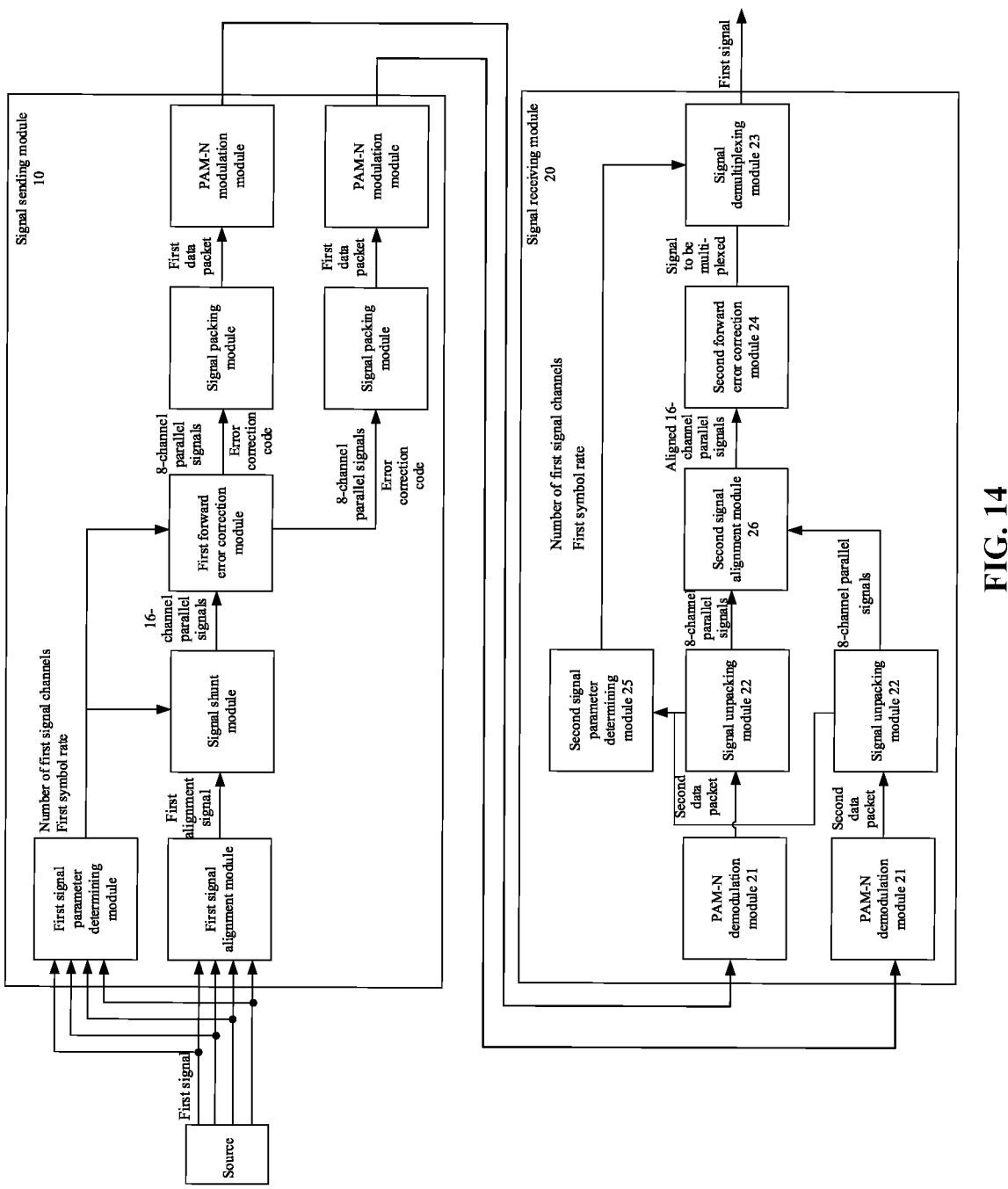
FIG. 14 shows a schematic structural diagram of a signal transmission device in some other embodiments of the present disclosure.

For the convenience of understanding, one embodiment of the present disclosure takes 16-channel parallel signals as an example, and description is made in combination with a signal transmission device shown in FIG. 14. FIG. 14 shows a schematic structural diagram of a signal transmission device in some other embodiments of the present disclosure.

It should be noted that the signal transmission device shown in FIG. 14 is composed of the signal sending module shown in FIG. 9 and the signal receiving module shown in FIG. 13.

In the signal transmission device shown in FIG. 14, a signal transmitting cable 30 includes a plurality of cores 31, and a signal sending module 10 includes a plurality of signal packing modules 15 and a plurality of PAM-N modulation modules 12, wherein the signal packing modules are in one-to-one correspondence with the PAM-N modulation modules. An output end of each signal packing module in the plurality of signal packing modules is connected to an input end of the PAM-N modulation module corresponding thereof. Correspondingly, a signal receiving module 20 includes a plurality of PAM-N demodulation modules 21 and a plurality of signal unpacking modules 22. The plurality of PAM-N demodulation modules 21 and the plurality of signal unpacking modules 22 are in one-to-one correspondence with the plurality of cores 31; input ends of the plurality of PAM-N demodulation modules are respectively connected to the corresponding cores, output ends of the plurality of PAM-N demodulation modules are respectively connected with the corresponding signal unpacking modules, while output ends of the plurality of signal unpacking modules are all connected to an input end of a second signal parameter determining module.

In the signal sending module of FIG. 14, a signal shunt module outputs 16-channel parallel signals to a first forward error correction module 14, and generates error correction codes of the 16-channel parallel signals, wherein 8-channel parallel signals and the error correction codes thereof are input to one signal packing module 15, and the other 8-channel parallel signals and the error correction codes thereof are input to another signal packing module 15, thus forming two first data packets, which are transmitted to the signal receiving module through different cores. One set of PAM-N demodulation modules 21 and signal unpacking modules 22 in the signal receiving module demodulate and unpack one of the first data packets, and the other set of PAM-N demodulation modules 21 and signal unpacking modules 22 demodulate and unpack the other first data packet, and further obtain a plurality of unpacked signals on the basis of obtaining a plurality of second data packets.

According to the signal transmission device and the corresponding signal transmitting method thereof shown in any of the previous embodiments, one set of signal sending modules and signal receiving modules, and their respective signal sending methods and signal receiving methods can be separated.

It should be further noted that the signal sending module obtained by separation can be used in combination with other signal receiving modules. Similarly, the signal receiving module obtained by separation can also form another signal transmission device with other signal sending modules.

Although several embodiments of the present disclosure have been shown and described herein, it is obvious to those skilled in the art that such embodiments are provided by way of example only. Those skilled in that art can think of many changes, alteration and substitutions without departing from the spirit and idea of the present disclosure. It should be understood that various alternatives to the embodiments of the present disclosure described herein can be adopted in the practice of the present disclosure. The appended claims are intended to define the scope of protection of the present disclosure, and therefore cover equivalents or alternatives within the scope of these claims.

What is claimed is:

1. A signal transmission device, comprising: a signal sending module, a signal receiving module and a signal transmitting cable;

wherein, the signal sending module comprises:

a first signal parameter determining module, configured to connect to a source, for receiving a first signal provided by the source to determine a first number of first signal channels and a first symbol rate; wherein the first number of first signal channels is a quantity of signal channels used by the source to provide the first signal, and the first symbol rate is a symbol rate of the first signal from the source;

a pulse amplitude modulation module using N different signal levels (PAM-N modulation module), configured to perform PAM-N modulation processing on the first signal to output a second signal, wherein a quantity of signal channels in the second signal is less than or equal to the first number of the first signal channels; and wherein the first signal parameter determining module is further configured to identify changes in the first number of first signal channels and/or the first symbol rate in a signal sending process, and to adjust a modulation mode of the PAM-N modulation module accordingly to accommodate changes in the first number of first signal channels and/or the first symbol rate; and the signal receiving module comprises:

a PAM-N demodulation module, configured to connect to the signal transmitting cable for demodulating the second signal; and wherein a demodulation mode of the PAM-N demodulation module corresponds to a modulation mode of the first signal in the PAM-N modulation module.

2. The signal transmission device according to claim 1, wherein:

the signal sending module further includes:

a first signal alignment module configured to connect the source to time align the first signal, thereby forming a first aligned signal;

a first forward error correction module configured to generate an error correction code based on the first aligned signal; and a signal packing module configured to take a received signal as a signal to be modulated, to pack the received signal into a first data packet and to incorporate the first number of first signal channels and the first symbol rate into a header information of the first data packet.

3. The signal transmission device according to claim 2, wherein:

the first forward error correction module is connected to the first signal alignment module; and the signal packing module is connected to both the first forward error correction module and the first signal parameter determining module, wherein the signal packing module takes the first aligned signal from the first signal alignment module as the signal to be modulated.

4. The signal transmission device according to claim 2, wherein:

the signal packing module is connected to both the first signal alignment module and the first signal parameter determining module, wherein the signal packing module takes the first aligned signal from the first signal alignment module as the signal to be modulated; and the first forward error correction module is connected with the signal packing module, wherein the first forward error correction module incorporates the generated error correction code into the first data packet.

5. The signal transmission device according to claim 2, wherein:

the signal receiving module further comprises:

a signal unpacking module, connected to the PAM-N demodulation module, configured to read a second data packet output from the PAM-N demodulation module to obtain the first number of first signal channels and the first symbol rate, and to decode the second data packet into an unpacked signal;

a second forward error correction module, connected to the signal unpacking module, and configured to perform error correction decoding on the unpacked signal based on an error correction code in the second data packet; and a signal demultiplexing module, with an output end configured to connect to a sink, and with input ends connected to both the second forward error correction module and a second signal parameter determining module, and configured to take the unpacked signal after the error correction decoding as a signal to be demultiplexed, to demultiplex the signal to be demultiplexed onto corresponding signal lines with a same number as the first number of first signal channels to form the first signal, and to output the first signal on the corresponding signal lines at the first symbol rate to the sink; and the second signal parameter determining module, connected to the signal unpacking module, and the signal demultiplexing module, and configured to identify the first number of first signal channels and the first symbol rate from a header information read by the signal unpacking module, and to control the signal demultiplexing module to demultiplex the signal to be multiplexed based on the first number of first signal channels and the first symbol rate.

6. The signal transmission device according to claim 5, wherein:

the signal transmitting cable comprises a plurality of cores;

the signal sending module comprises: a plurality of signal packing modules and a plurality of PAM-N modulation modules; the plurality of signal packing modules are in one-to-one correspondence with the plurality of PAM-N modulation modules, wherein input ends of the plurality of signal packing modules are all connected to the first signal alignment module and output end of the first signal parameter determining module, and an output end of each signal packing module in the plurality of signal packing modules is connected to each PAM-N modulation module of the plurality of PAM-N modulation modules corresponding to each signal packing module of the plurality of signal packing modules;

the signal receiving module comprises: a plurality of PAM-N demodulation modules and a plurality of signal unpacking modules, wherein the plurality of PAM-N demodulation modules and the plurality of signal unpacking modules are in one-to-one correspondence with the plurality of cores; wherein input ends of the plurality of PAM-N demodulation modules are respectively connected with the corresponding cores, and output ends of the plurality of PAM-N demodulation modules are respectively connected with corresponding signal unpacking modules, the PAM-N demodulation modules being configured to demodulating second signals respectively transmitted by the plurality of cores to obtain a plurality of second data packets, and transmitting the plurality of second data packets to respective signal unpacking modules; and wherein output ends of the plurality of signal unpacking modules are all connected to an input end of the second signal parameter determining module, and the signal unpacking modules are configured to decoding the plurality of second data packets into a plurality of unpacked signals.

7. The signal transmission device according to claim 5, wherein:

the signal sending module further comprises: a signal shunt module, wherein input ends of the signal shunt module are connected to the first signal alignment module and the first signal parameter determining module, and an output end of the signal shunt module is connected to an input end of the first forward error correction module, and the signal shunt module is configure to shunt the first aligned signal into multi-channel parallel signals based on the first number of first signal channels and the first symbol rate;

the first forward error correction module is configured to generate an error correction code according to the multi-channel parallel signals; and the signal packing module is configured to take the multi-channel parallel signals output from the signal shunt module as a signal to be modulated; and the signal receiving module further comprises a second signal alignment module, wherein:

the unpacked signal decoded by the signal unpacking module is multi-channel parallel signals;

an input end of the second signal alignment module is connected with an output end of the signal unpacking module, and an output end of the second signal alignment module is connected with an input end of the second forward error correction module, wherein the second signal alignment module is configured to align the multi-channel parallel signals output from the signal unpacking module in time;

the second forward error correction module is configured to perform error correction decoding on the aligned multi-channel parallel signals based on the error correction code in the second data packet; and the signal demultiplexing module is configured to take the multi-channel parallel signals after the error correction decoding as the signal to be demultiplexed.

8. The signal transmission device according to claim 1, wherein:

the first signal is a high-speed signal, comprising a multimedia signal and/or a clock signal.

9. The signal transmission device according to claim 1, wherein:

a symbol rate of the second signal is less than or equal to the first symbol rate.

10. The signal transmission device according to claim 6, wherein:

a number of the PAM-N modulation modules is a same number of the PAM-N demodulation modules.

11. The signal transmission device according to claim 1, wherein:

a core of the signal transmitting cable is copper wire.

12. A signal transmission device, comprising: a signal sending module, a signal receiving module and a signal transmitting cable, wherein the signal sending module comprises:

a first signal parameter determining module, configured to connect to a source, for receiving a first signal provided by the source to determine a first number of first signal channels and a first symbol rate; wherein the first number of first signal channels is a number of signal channels used by the source to provide the first signal, and the first symbol rate is a symbol rate of the first signal provided by the source; and a pulse amplitude modulation module using N different signal levels (PAM-N modulation module), configured to perform PAM-N modulation processing on the first signal to output a second signal, wherein a number of signal channels in the second signal is less than or equal to the first number of the first signal channels;

the signal receiving module comprises:

a PAM-N demodulation module configured to connect to the signal transmitting cable, for demodulating the second signal acquired from the signal transmitting cable to obtain a second data packet;

a signal unpacking module, configured to connect to an output end of the PAM-N demodulation module, for reading header information of the second data packet to obtain the first number of first signal channels and the first symbol rate, and decoding the second data packet into unpacked signals; and a signal demultiplexing module, configured to connect to a sink and an output end of the signal unpacking module, for taking the unpacked signals as a signal to be demultiplexed according to the first number of first signal channels and the first symbol rate, demultiplexing the signal to be demultiplexed onto corresponding signal lines with a same number as the first number of first signal channels to form the first signal, and transmitting the first signal on the corresponding signal lines at the first symbol rate.

13. The signal transmission device according to claim 12, wherein:

the first signal parameter determining module is configured to identify changes of the first number of first signal channels and/or the first symbol rate in signal sending process;

the PAM-N modulation module is configured to change a modulation mode based on the identified changes from the first signal parameter determining module to adapt to the changes in the first number of first signal channels and/or the first symbol rate; and a demodulation mode of the PAM-N demodulation module corresponds to a modulation mode of the first signal in the PAM-N modulation module.

14. A signal transmission device, comprising: a signal sending module, a signal receiving module and a signal transmitting cable;

wherein, the signal sending module comprises:

a first signal parameter determining module, configured to receive a first signal provided by a source to determine a first number of first signal channels and a first symbol rate; wherein the first number of first signal channels is a quantity of signal channels used by the source to provide the first signal, and the first symbol rate is a symbol rate of the first signal from the source;

a pulse amplitude modulation module using N different signal levels (PAM-N modulation module), configured to perform PAM-N modulation processing on the first signal to output a second signal, wherein a quantity of signal channels in the second signal is less than or equal to the first number of the first signal channels; and the signal transmitting cable configured to transmit the second signal;

the signal receiving module comprises:

a PAM-N demodulation module, configured to connect to the signal transmitting cable for demodulating the second signal to obtain a second data packet;

a signal unpacking module configured to read the second data packet output from the PAM- N demodulation module to obtain the first number of first signal channels and the first symbol rate, and to decode the second data packet into an unpacked signal; and a signal demultiplexing module, configured to take the unpacked signal as a signal to be demultiplexed, to demultiplex the signal to be demultiplexed onto corresponding signal lines with a same number as the first number of first signal channels to form the first signal, and to output the first signal on the corresponding signal lines at the first symbol rate to a sink.

15. The signal transmission device according to claim 14, wherein:

the signal sending module further includes:

a first signal alignment module configured to align the first signal from M-channel serial signals into M-channel parallel signals, wherein M is a positive integer;

a first forward error correction module configured to generate an error correction code based on the M-channel parallel signals through a forward error correction coding technology;

a signal packing module configured to pack the M-channel parallel signals as a signal to be modulated, and the error correction code into a first data packet, and to incorporate the first number of first signal channels and the first symbol rate into a header information of the first data packet;

the PAM-N modulation module configured to determine a modulation mode accordingly to the first number of first signal channels and the first symbol rate; and to modulate a packed signal to be modulated based on the determined modulation mode to obtain the second signal.

16. The signal transmission device according to claim 14, wherein:

the PAM-N modulation module configured to determine a modulation mode corresponding to a modulation mode number N; and the PAM-N demodulation module configured to demodulate the second signal with the determined modulation mode which is corresponding to a number N of the modulation mode to obtain the second data packet, wherein solving $$\frac{n}{\log_2 N} \leq 1$$

to obtain the mouulation mode number N, n donates the quantity of first signal channels.

17. The signal transmission device according to claim 15, wherein, the signal sending module further comprises: a signal shunt module, configure to shunt the M-channel parallel signal into S1 channel parallel signals based on the first number of first signal channels and the first symbol rate; wherein S1 is greater than M, and S1 is a positive integer;

the first forward error correction module is configured to generate an error correction code based on the S1 channel parallel signals through the forward error correction coding technology; and the signal packing module is configured to pack the S1-channel parallel signals as a signal to be modulated and the error correction code into the first data packet, and to incorporate the first number of first signal channels and the first symbol rate into the header information of the first data packet.

18. The signal transmitting method according to claim 15, wherein the signal unpacking module configured to decode the second data packet into S2-channel parallel signals; wherein S2 is greater than or equal to 1, and S2 is a positive integer; and the signal receiving module further comprises:

a second forward error correction module configured to perform error correction decoding on the S2 channel parallel signals based on an error correction code in the second data packet; and the signal demultiplexing module, configured to demultiplex the S2-channel parallel signals to form the first signal based on the first number of first signal channels and the first symbol rate, wherein the first signal is M channel serial signals.

19. The signal transmission device according to claim 18, wherein the signal demultiplexing module, configured to demultiplex the S2 channel parallel signals being error correction decoded onto corresponding signal lines with a same number as the first number of first signal channels to form the first signal, and to output the first signal on the corresponding signal lines at the first symbol rate to the sink.

20. The signal transmission device according to claim 14, wherein the unpacked signal is M channel parallel signals, and M is a positive integer; and the signal receiving module further comprises:

a second forward error correction module configured to perform error correction decoding on the M-channel parallel signals based on an error correction code in the second data packet; and the signal demultiplexing module, configured to demultiplex the M-channel parallel signals being error correction decoded onto corresponding signal lines with a same number as the first number of first signal channels to form the first signal, and to output the first signal on the corresponding signal lines at the first symbol rate to the sink.

* * * * *